US006549903B1

(12) United States Patent
Babaian et al.

(10) Patent No.: US 6,549,903 B1
(45) Date of Patent: Apr. 15, 2003

(54) INTEGRITY OF TAGGED DATA

(75) Inventors: Boris A. Babaian, Moscow (RU);
Feodor A. Gruzdov, Moscow (RU);
Vladimir Y. Volkonsky, Moscow (RU);
Yuli K. Sakhin, Moscow (RU)

(73) Assignee: Elbrus International Limited, George Town (KY)

(*) Notice: Subject to any disclaimer, the term of this patent is extended or adjusted under 35 U.S.C. 154(b) by 0 days.

(21) Appl. No.: 09/505,570

(22) Filed: Feb. 17, 2000

Related U.S. Application Data (60) Provisional application No. 60/120,355, filed on Feb. 17, 1999.

(51) Int. Cl.[7] ............................ G06F 17/30; G06F 7/00; G06F 12/00; G06F 12/14; G06F 13/00
(52) U.S. Cl. .............................. 707/9; 711/108
(58) Field of Search .......................... 707/200, 103, 707/205, 10, 206; 711/137, 119, 5

(56) References Cited

U.S. PATENT DOCUMENTS

| | | | | |
|---|---|---|---|---|
| 5,201,056 A | * | 4/1993 | Daniel et al. | 712/41 |
| 5,249,212 A | * | 9/1993 | Covey et al. | 714/765 |
| 5,367,653 A | * | 11/1994 | Coyle et al. | 711/128 |
| 5,509,137 A | * | 4/1996 | Itomitsu et al. | 711/168 |
| 5,794,029 A | | 8/1998 | Babaian et al. | 395/588 |
| 5,889,985 A | | 3/1999 | Babaian et al. | 395/566 |
| 5,893,121 A | * | 4/1999 | Ebrahim et al. | 707/206 |
| 5,923,871 A | | 7/1999 | Gorshtein et al. | 395/562 |
| 5,940,311 A | * | 8/1999 | Dao et al. | 708/204 |
| 5,958,048 A | | 9/1999 | Babaian et al. | 712/241 |
| 6,014,728 A | * | 1/2000 | Baror | 711/133 |
| 6,067,600 A | * | 5/2000 | Pawlowski | 711/119 |

OTHER PUBLICATIONS

The Russians are Coming, Keith Diefendorff, Microprocessor Report, vol. 13, No. 2, Feb. 15, 1999.
On the Advantages of Tagged Architecture, Edward A. Feustel, IEEE Transactions on Computers, vol. C–22, No. 7, Jul. 1973, pp. 644–656.
A Hardware Implementation of Capability–Based Addressing, G. H. Myers and B.R.S. Buckingham, Operating Systems Review, 14(4), 1980, pp. 13–25.
IA–64 Intel Application Developer's Architecture Guide, May 1999.

(List continued on next page.)

Primary Examiner—Safet Metjahic
Assistant Examiner—Merilyn Nguyen
(74) Attorney, Agent, or Firm—Townsend and Townsend and Crew LLP (57) ABSTRACT

A method and computer apparatus are presented for providing a secure data architecture for computer memory of a processor. The apparatus comprises a memory unit and a processing unit. Data are stored in the memory unit and manipulated by the processing unit, which is programmed to implement the data architecture. Tagged single data words are formed by concatenating a tag to each of the single data words. Each of the tags takes a value that corresponds to the data type of the single data word to which it is concatenated. A data multiword is creating by concatenating tagged single data words having the same data type. The data multiword is stored within a location in the computer memory, the location selected to ensure alignment of the data multiword in accordance with its length. An effective tag value is constructed for the data multiword by concatenating all of its single word tags. An operation is prevented from being performed on the data multiword if the effective tag value is not one of a predetermined list of valid effective tag values for the operation.

30 Claims, 2 Drawing Sheets (a) Single-word structure 0 0 - numeric type;
0 1 - single-word, non-numeric type;
1 0 - component of double-word, non-numeric type;
1 1 - component of quadruple-word, non-numeric type

OTHER PUBLICATIONS

D. Scott Wills, W. Stephen Lacy, Huy Cat, Michael a. Hopper, Ashutosh Razdan, and Sek M. Chai (1993), Pica: An Ultra–Light Processor for High–Throughput Applications, pp. 410–414.*

Nicholas P. Carter, Stephen W. Keckler, and William J. Dally (1994), Hardware Support for Fast Capability–based Addressing, pp. 319–327.*

Mitsuhisa Sato, Shuichi Ichikawa, and Eiichi Goto (1989), Run–time checking in Lisp by intergrating memory addressing and range checking, pp. 290–297.*

Anant Agarwal, Beng–Hong Lim, David Kranz, and John Kubiatowicz (1990), April: A Processor Architecture for Multiprocessing, pp. 104–114.*

* cited by examiner (a) Single-word structure 0 0 - numeric type;

0 1 - single-word, non-numeric type;

1 0 - component of double-word, non-numeric type;

1 1 - component of quadruple-word, non-numeric type (b) Single-word types numeric type non-numeric type (c) Double-word types numeric type non-numeric type (d) Quadruple-word types numeric type non-numeric type

INTEGRITY OF TAGGED DATA

This application claims the priority of Provisional Application No. 60/120,355, filed Feb. 17, 1999, which is herein incorporated by reference for all purposes.

BACKGROUND OF THE INVENTION

1. Field of the Invention

The present invention relates generally to operational methods used by processors and computing devices. More particularly, the invention relates to a method and apparatus for using a data-type tag concatenated to each data word stored in memory to preserve the integrity of a data architecture.

2. Description of the Related Art

The utility of computer processors is primarily evaluated according to three criteria: speed of operation, compatibility with other systems, and reliability. A processor's reliability depends on the data security it provides for programming and system usage. As the size of applications run on such processors has increased over the past years, so has the importance of providing such security. A large program typically consists of a large number of modules or subprograms (hereinafter referred to collectively as "modules"), each of which may have been designed and/or written by a different individual. When such modules interact, security features are necessary to isolate the effects of an error to the module in which it occurred—it should be impossible for an error that originates in a first module to corrupt data used by a second module and thereby interfere with the operation of the second module.

The scope of such security issues is broad, being relevant not only for protecting against innocent errors inadvertently introduced by programmers, but also for safeguarding against deliberately perpetuated malicious actions, such as may be introduced by various computer viruses. Moreover, this concept of providing data security in concert with modularity, while outlined above for an individual program, may readily be extended to encompass preserving safe interaction among multiple programs on a larger scale. A conspicuous example of such a large-scale program interaction is the internet, which can usefully be regarded as a single extended application composed of a large number of interacting programs. With the continued growth of use of the internet, the importance of maintaining data security by isolating the effects of errors to individual modular programs continues to increase.

A useful conceptual framework in which to understand approaches to data security involves "user context." This refers to all space available to the user, including registers, memory locations, files, etc., which a human user might recognize as variables, arrays, a functions, objects, modules, etc. In a more general sense, user context refers to the space available to any active agent, including a task, program, procedure, etc., in addition to a human user. In this more general sense, the user context for a function would include its local and global variables, functions, and parameters, and as well as those spaces that are pointed to by pointers within those variables and parameters. Within this framework, the requirements for data security discussed above are equivalent to requiring that user context not be expanded.

Methods for limiting user context, i.e. preventing the programs and data of one module from unauthorized access by another module, operate in part by identifying the data type of individual data words. Certain functions (such as moving pointers and descriptors) are prohibited from operating on data words that are not identified with the appropriate data type. Such data-type checking can be performed at different times, depending on the structure of the computer language used. For example, in the case of high-level languages, it is possible to check these data types and grant corresponding data-access rights to the proper modules at the time of compilation. This requires that certain static restrictions be introduced into the language, which make it nonuniversal and adversely affect its efficiency for many applications. In particular, to permit the compiler to check that pointers and descriptors are handled correctly, it is necessary to have statically known variable types that remain constant during the variable's entire life. While this has the modest advantage that data-type checking is completed with compilation of a program, these static variables can only be moved or used for object access, and cannot be used for such operations as arithmetic or logic operations. Despite these deficiencies, several high-level languages, such as Java, adopt this tactic.

A more efficient approach involves checking variable data types dynamically at run time; this can either be done exclusively by software or may be complemented with hardware support to increase the level of efficiency even further. Both of these dynamic approaches are actively used in different languages. A number of languages, such as LISP and Smalltalk, use exclusively software-based run-time checking, which is somewhat simpler to implement but lacks the additional efficiencies possible from including hardware support.

The inclusion of hardware support lends itself to different ways of making use of that support. Common to these different ways is the notion of "capabilities." A capability is a descriptor that defines the access rights for some operational space. Such a descriptor may, for example, take the form of an array descriptor or a procedure label. With hardware support, user context can be defined by the list of capabilities that the user possesses. In order to limit user context, a capability should be protected from unauthorized modification. To implement data security features, there should therefore be both means for distinguishing capabilities from other data and there should be a mechanism for preventing ordinary data from being used as capabilities.

The most popular approach for implementing data security features with these constraints is use of a "capability list," which is a tabulation of data types and corresponding data words stored in separate memory segments. In this approach, all pointers and descriptors are kept in special typed segments and have special operations to work with these segments. Capabilities are kept distinct from other data by imposing requirements on operators that act on data: an operation that acts on a capability (e.g. LOAD or STORE) can only get its operands from the separate memory segments where the capability list is stored; other operations (e.g. ADD or MULTIPLY) can never operate on those separate memory segments. While several processors have been built using this approach, they still suffer from significant inefficiencies, both in speed of operation and in the flexibility afforded to programmers. These inefficiencies are a direct consequence of the restriction inherent in this approach that separate memory segments be used to store the capabilities.

An alternative approach involves the use of data tags, which permit greater flexibility without significant adverse effect on efficiency. In this approach, operational spaces are not separated. Instead, data tags record the data types of data words in extra bits concatenated to each data word. As such, the inefficiency produced from storing capabilities in separate memory segments is avoided. Capabilities are separated from other data by the positioning of the tag with respect to the data words. Also, operations are defined such that only a particular set of data types are permissible for each operand. For example, the LOAD operation could be defined to load both the capability and data in the form of a tagged data word by having two operands, the first restricted to being a capability and the second restricted to being other data. An operation such as ADD would, however, require that both of its operands be numbers.

In modern processors, there is a need to handle both numeric data and non-numeric data, which can be distinguished by using separate tags. However, there has so far been no processor that has used a fully consistent set of capability-based features to provide overall tagged data integrity and protection in an architecture with several non-numeric data formats.

SUMMARY OF THE INVENTION

The present invention is directed to a method and computer apparatus for providing a secure data architecture for computer memory of a processor. The apparatus comprises a memory unit and a processing unit. Data are stored in the memory unit and manipulated by the processing unit, which is programmed to implement the data architecture. In one embodiment, a plurality of tagged single data words is formed by concatenating a tag to each of the single data words. Each of the tags takes a value that corresponds to the data type of the single data word to which it is concatenated. A data multiword is creating by concatenating a plurality of tagged single data words having the same data type. The data multiword is stored within a location in the computer memory, the location selected to ensure alignment of the data multiword in accordance with its length. An effective tag value is constructed for the data multiword by concatenating each of the tags of the tagged single data words comprised by the data multiword. An operation is prevented from being performed on the data multiword if the effective tag value is not one of a predetermined list of valid effective tag values for the operation.

In another embodiment, a plurality of tagged non-numeric single data words are formed by concatenating a tag to each of the single data words. The tag has a value that corresponds to the data type of the single data word to which it is concatenated. A plurality of non-numeric data multiwords are created, each formed by concatenating a plurality of tagged single data words having the same non-numeric data type. At least two of the data multiwords so created comprise a different number of bits. An effective tag value is constructed for each data multiword by concatenating each of the tags from the data multiword together. An operation is prevented from being performed on that data multiword if the effective tag value is not one of a predetermined list of valid effective tag value for the operation.

In still another embodiment, the invention is directed to a method and computer apparatus for providing program debugging instructions. A plurality of tagged single data words are formed by concatenating a tag to each single data word. The tag takes a value that corresponds to the data type of the single data word to which it is concatenated. A multiword is created by concatenating a plurality of tagged single data words having the same data type. The data multiword is stored within a location in a computer memory, the location selected to ensure alignment of the data multiword in accordance with its length. An effective tag value is constructed for the data multiword by concatenating each of the tags from the data multiword together. An operation is prevented from being performed on the first data multiword if the effective tag value is not one of a predetermined list of valid effective tag values for the operation. A user is notified in response to an attempt to perform the operation on the data multiword.

ADVANTAGES OF THE INVENTION

The tagged-word data architecture of the present invention presents numerous advantages, some of which are herein enumerated. The technique is conceptually fundamental and simple, resulting in an approach to handling a plurality of data types that is both sound and reliable. This is achieved without placing restrictions on programming freedom, except for those limitations specifically introduced for security purposes to preserve the integrity of the tagged data.

The architecture also provides a very good debugging facility because intensive run-time type checking is automatically switched on everywhere without the need to use additional resources. Many typical errors that are made by programmers are detected automatically, such as a failure to initialize data or a violation of array bounds. The normal operation of the system of the invention essentially includes a good debugger that runs automatically in the background during program execution without the need for additional speed or memory space losses.

Furthermore, the system is not oriented to any specific high-level language. Implementation of compilers for any high-level language, including Java, SmallTalk, C, and C++, is equally straightforward. All programs with this implementation, including the operating system, have good modularity and security so there is no need for a special design of a kernel for the operating system; the same programming technology is used for the kernel as for the shell and other applications, making the operating system smaller, more elegant, more efficient, and more reliable.

There is very little cost for achieving these advantages, other than the need for approximately 6% more memory space to store the tag bits. There is no loss of execution performance and the invention achieves a necessary balance between the competing requirements of system efficiency and data integrity.

BRIEF DESCRIPTION OF THE DRAWINGS

The present invention is now described in detail with reference to the accompanying drawings, wherein:

FIG. 1(a) shows how a tagged single data word is constructed; FIG. 1(b) shows how numeric and non-numeric single data words are represented within the architecture; FIG. 1(c) shows how numeric and non-numeric double data words are represented within the architecture; FIG. 1(d) shows how numeric and non-numeric quadruple data words are represented within the architecture; FIG. 2(a) shows how the architecture responds to a "STORE A BYTE" operation; FIG. 2(b) shows how the architecture responds to a "STORE A WORD" operation.

DESCRIPTION OF THE SPECIFIC EMBODIMENTS

OVERVIEW OF THE DATA ARCHITECTURE

The method and apparatus of the invention use tags concatenated to each data word stored in a computer memory. The apparatus comprises a memory unit, and a processing unit. The data are stored in the memory unit and manipulated by the processing unit, which is programmed to implement the data architecture. As used herein, a "data word" refers generally to a string that comprises a specific number of bytes; in the particular embodiments discussed, the length of each such string is four bytes, but it will be appreciated that the invention also encompasses tagging strings that consist of a different number of bytes. Each tag consists of a predetermined number of bits N and takes one of $2^N$ values that uniquely identifies the data type of the data word to which it is concatenated. In an embodiment where the predetermined number of bits for each tag is two, for example, there are thus four possible data types that each data word may take.

In a preferred embodiment, these four data types correspond to:

(1) Numeric data—a tagged data word of numeric data may represent a number itself or may be part of a multiword representation of a number, e.g., as a double or quadruple word;

(2) a single word of non-numeric data;

(3) a single word that is part of a double word of non-numeric data—such a format may be used to represent, e.g., a label that contains a target address; and (4) a single word that is part of a quadruple word of non-numeric data—such a format may be used to represent, e.g., a descriptor that defines a block of data by specifying the base address of the block and the size of the block.

Figure 1:
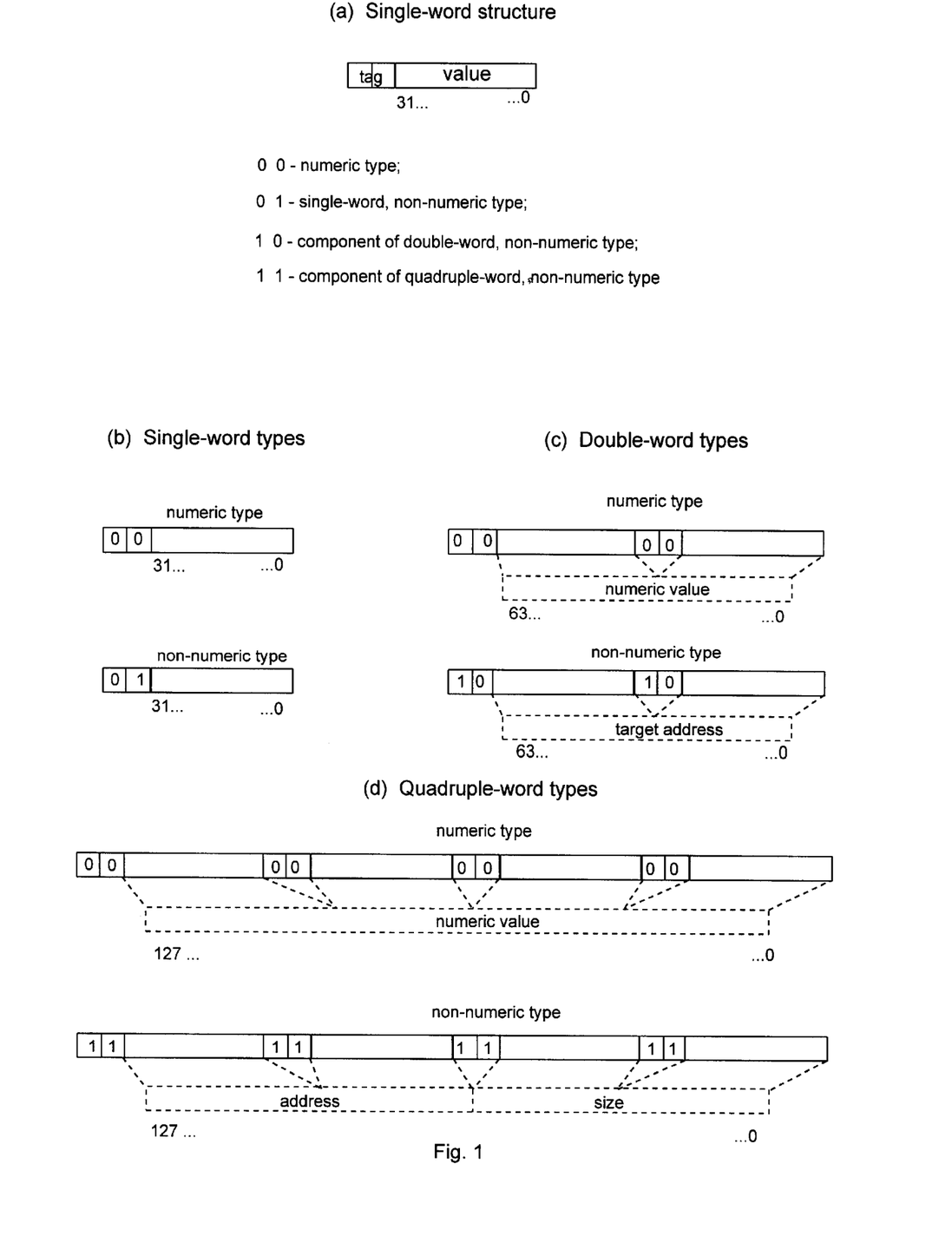
FIG. 1 presents an illustration of one embodiment of the tagged data architecture.

The data architecture that results from incorporating these four data types is illustrated in FIG. 1. A tagged four-byte data word is shown schematically in FIG. 1(a). In this example, the tag consists of two bits that are used to identify the data type of this data word, the possible data types corresponding to those listed above: a tag of 0 ($00_2$) denotes a numeric data type; a tag of 1 ($01_2$) denotes that the data word is a non-numeric single word; a tag of 2 ($10_2$) denotes that the data word is an element of a non-numeric double word; and a tag of 3 ($11_2$) denotes that the data word is an element of a non-numeric quadruple word. [As used herein, subscripts on numerical values denote the base in which the numerical value is represented; the lack of a subscript indicates that the base is 10.] As noted in the figure, the single four-byte data word consists of 32 bits so that the entire data word is stored with 34 bits including the tag information.

How this data architecture is applied for storage of arbitrary single, double, and quadruple words is illustrated in FIGS. 1(b)–1(d). In each instance, the data word may store numeric or non-numeric data. Thus, for example, a single word, as shown in FIG. 1(b) is encoded with a 34-bit string, the first two bits taking the value $00_2$ or $01_2$ respectively to specify whether the word represents numeric or non-numeric data, and the subsequent 32 bits being used to store the single word itself.

A double word is stored by concatenating the two tagged single-word elements that make up the double word, as shown in FIG. 1(c). In this case, the double word thus comprises two tags, one for each of the component single words. The two tags are identical (either $00_2$ for a numeric double word or $10_2$ for a non-numeric double word) because numeric and non-numeric types cannot be mixed in forming the double word. This constraint serves as one check that is used to validate data coding of double words. The total memory used to store the double word is thus 68 bits, with 4 bits being used for tags and 64 bits being used to store the eight-byte double word itself. Because the data architecture uses a tag for every four-byte word, the 64 bits that make up the double word are stored noncontiguously; in the illustrated case they are stored in two separate segments of equal length. One example that illustrates the use of a non-numeric double word is indicated in the figure by showing the storage of a target address. In the illustration, the target address consists of 64 bits, so it must be obtained by concatenating the non-contiguously stored single-byte words together.

A quadruple word is stored completely analogously to the manner in which a double word is stored, as illustrated in FIG. 1(d). The quadruple word comprises four identical tags, one for each of its component single words, each of the tags being either $00_2$ for numeric types or $11_2$ for non-numeric types. The total memory needed to store the quadruple word is 136 bits, with 8 bits being used for the tags and 128 bits being used for the 16-byte quadruple word itself. As for the storage of a double word, the tag structure requires that the quadruple word be stored noncontiguously, in four separate segments of equal length. The figure also illustrates an exemplary embodiment in which a non-numeric quadruple word is used to store a descriptor for a data block, the description consisting of the block's base address and size. In the illustration, both the base address and size consist of 64 bits, which are constructed by concatenating the first-second and third-fourth component single words together. In other applications, it will be necessary to create other combinations of the component single words.

The invention encompasses different ways of defining the position taken by single-word components of "multiwords," which are defined herein to be concatenations of a plurality of single words, such as double words or quadruple words. In a preferred embodiment, the data architecture uses strictly aligned memory and register allocations of word formations. This alignment maintains the correct ordering of the single-word components of multiwords and prevents random exchange of these components. The value of this feature of the invention is evident from the illustrations of FIG. 1, in which the proper concatenation of the single-word components of multiwords was simplified because of the strict alignment. In this embodiment, the location address itself serves to define what position a single-word component takes within the multiword. In an alternative embodiment, strict alignment is not required and the relationship between the single-word components is instead defined by augmenting the size of the tag and using the additional tag bits to define the position taken by a single-word component within the multiword.

While the illustrations of the data architecture shown in FIG. 1 have shown the tag concatenated to the front of the data word, it will be understood that the invention is not so limited. Other concatenations, such as to the back of the data word, are also within the scope of the invention.

DATA PROCESSING

Effective Tags

The tagged data architecture lends itself to the efficient performance of several functions, some of which make use of an "effective tag." The effective tag is created by concatenating all the tags of a given data word. For purposes of illustration, the effective tags are tabulated in binary and hexadecimal in TABLE I for the specific two-bit-tag embodiment described above. The number of distinct effective tags in this embodiment is only four: all numeric words have an effective tag of $0_{16}$, a non-numeric single word has an effective tag of $1_{16}$, a non-numeric double word has an effective tag of $A_{16}$, and a non-numeric quadruple word has an effective tag of $FF_{16}$.

TABLE I

| Data Word | Effective tag (binary) | Effective tag (hexadecimal) |
|---|---|---|
| Numeric single word | $00_2$ | $0_{16}$ |
| Non-numeric single word | $01_2$ | $1_{16}$ |
| Numeric double word | $0000_2$ | $0_{16}$ |
| Non-numeric double word | $1010_2$ | $A_{16}$ |
| Numeric quadruple word | $00000000_2$ | $0_{16}$ |
| Non-numeric quadruple word | $11111111_2$ | $FF_{16}$ |

Two principles are used to define the limitations placed on individual operations used to implement the data security features. First, every operation checks at least the types of its operands (and perhaps also their values) against a predefined list of permitted types (and perhaps values). In different embodiments, a mismatch between the type of the operand and the permitted type causes either generation of an "illegal operand" exception or forces the invalid operand to be numeric. Forcing the invalid operand to be numeric is achieved by converting the tag value to $00_2$. While both of these responses to invalid operands prevent violation of user context limits, the generation of an exception is additionally useful in debugging errors.

Second, modification of a storage location destroys any non-numeric data that may have occupied that location. Destruction of the non-numeric data is performed by invalidating an effective tag. Application of these two principles is illustrated in the following examples of operations and the restrictions that are placed on them by the data architecture.

EXAMPLES (i) Direct Tag Modification: The PUT TAG Operation

Direct modification of a tag is conceivably possible through use of an operation such as PUT TAG ($Op_1$, $Op_2$), which would be defined to place a least number of bits of the first operand $Op_1$, into the tag bits of the second operand $Op_2$. Such direct modification of a tag by a user is prohibited in the architecture, with the exception in one embodiment that a user is permitted to modify a tag value to become $00_2$, i.e. changing the type so that the data word represents numeric data. This sole direct modification is permitted because it does not widen user context, as would changes among types of non-numeric data. An impermissible attempt to perform direct modification of a tag value will therefore generate an "illegal operand" exception generation or will convert the tag to $00_2$. The PUT TAG operation is also an example of on operation where the values of the operands are checked since the first operand $Op_1$ is permitted only to have the value $00_2$.

(ii) Data Movement Operations

In a preferred embodiment, an operation that produces or transfers only part of a non-numeric multiword is prohibited. A simple example is the "MOVE SINGLE WORD" operation, which-may permissibly act on data words tagged $00_2$ or $01_2$ but not on data words tagged $10_2$ or $11_2$. More generally, a "MOVE N-WORD" operation is not permitted to move a fragment from a data format that exceeds N, but may permissibly move data of any other format. Such data movement is permissible because these other formats are wholly encapsulated within an N-word. Thus, the "MOVE DOUBLE WORD" operation is permitted not only to move double words (with $00_2$ or $10_2$ tags), but may also move single words (tagged $01_2$) as well. Similarly, the "MOVE QUADRUPLE WORD" operation may permissibly move data of quadruple-word, double-word, and single-word formats.

By checking the type of the operands, such data movement operations are prevented from transferring a fragment of a label or a descriptor. If the operand type is invalid for that movement operation, an "invalid operand" exception will be generated or the invalid operand will be forced to be numeric data, depending on the embodiment. Similar limitations are included for the movement of other types of data. By limiting the operands for this function, the integrity of the data architecture is maintained.

(iii) Arithmetic Operations

Arithmetic operations such as ADD, MULTIPLY, DIVIDE, and SUBTRACT are designed to combine two numeric values. Accordingly, each of these operations is defined in terms of two operands, which the architecture demands be numeric. This prevents the arithmetic operations from, for example, adding labels together or multiplying them. If either of the operands is non-numeric, it is preferred that a "invalid operand" exception be generated, although in a separate embodiment the architecture will force the invalid operand to be numeric data.

(iv) Memory Control Operations: LOAD and STORE

The LOAD and STORE operations are complementary operations used respectively to extract data words from memory and to place them into memory. The requirement that operands be checked before performing the operations prevents the LOAD and STORE operations from accepting numbers instead of a descriptors. Additionally, this check ensures that a LOAD operation will not read a fragment of a label or descriptor and that the STORE operation will not accept such a fragment as the stored data. The integrity of a multiword to be loaded or stored may further be checked to ensure that every tag of the component single words is identical. Although in one embodiment the values of the individual tags for each component of the multiword can be compared, it is preferably done by determining whether the effective tag takes one of the limited valid values.

Figure 2:
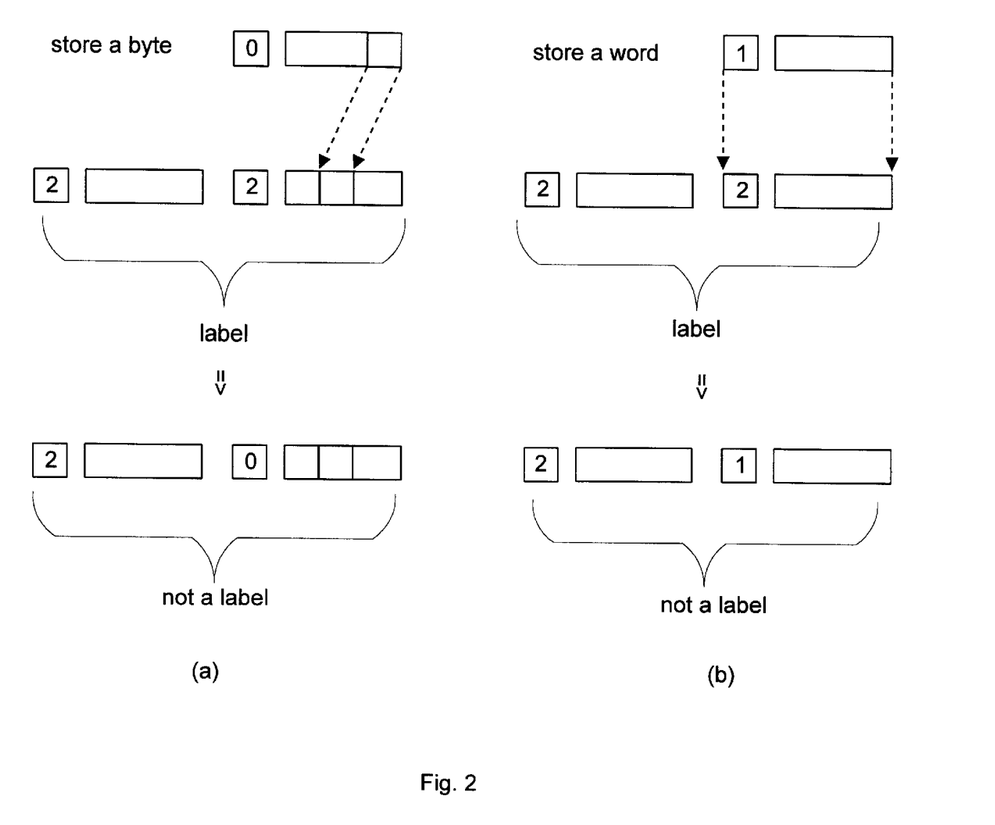
FIG. 2 presents examples of the security features embodied by the invention.

The requirement that modification of a storage location, including both memory and register locations, destroy non-numeric data that may have occupied that location is most easily illustrated with the STORE operation. Examples of how the STORE operation functions in accordance with this requirement are shown in FIG. 2. The effect of the "STORE A BYTE" operation performed on a non-numeric double word (tag=$10_2$) is shown in FIG. 2(a). Since a single byte is taken from numeric data, with tag value $00_2$, the tag-value of the single word component into which the byte is stored is changed to $00_2$. In the shown example, where the byte is stored in the second half of the double word, the effective tag value changes as a result of the operation from $1010_2$ (=$A_{16}$) to $1000_2$ (=$8_{16}$). If the byte were stored in the first word, the effective tag value would have changed to $0010_2$ (=$2_{16}$). As discussed previously, in this embodiment $A_{16}$ is a permissible effective tag value but neither $2_{16}$ nor $8_{16}$ is. The result is that the new double word is invalid if it was initially non-numeric. A similar result occurs for the operation of "STORE A BYTE" on a quadruple word. Only if the initial multiword contains numeric data can the operation of "STORE A BYTE" on a multiword produce a new valid (numeric) multiword. If an attempt is made to perform this operation on non-numeric data the result will be a conversion of the tag code to represent numeric data.

In FIG. 2(b) is illustrated the effect of the "STORE A WORD" operation where a single word is to be stored at a memory location occupied by part of a double word. Because of the restriction described above against moving a single-word portion of a multiword, the tag for the word to be stored must be $00_2$ or $01_2$. Such a storage operation simply overwrites the memory location and destroys any effective tag value for data stored there. Thus, if the single word to be stored is numeric, the effect of the "STORE A WORD" operation is similar to the "STORE A BYTE" operation, and a valid double word is produced only where the originally stored double word was numeric. A similar result ensues where the memory location was occupied by a four-word data string—the data architecture prohibits storing a data word as part of a non-numeric quadruple word unless it is identified by its tag to be a non-numeric quadruple-word component already.

The architectural features of the invention thus provide reliable security mechanisms that govern the manipulation of both numeric and non-numeric data records. A user has full freedom to control data structures up to the point where exercise of that control could corrupt the data. It is at that point that the invention's architecture limits the user's freedom so that the integrity of the data is maintained.

The above description is illustrative and not restrictive. Numerous substitutions and modifications will become apparent to those of skill in the art upon review of this disclosure and can be undertaken without departing from the true spirit and scope of the invention, which is defined in the following claims.

What is claimed is:

1. A method for constructing a secure data architecture for computer memory comprising the steps of:
   (a) forming a plurality of tagged single data words by concatenating a tag to each such single data word, each such tag taking a value corresponding to the data type of the single data word to which it is concatenated;
   (b) creating a data multiword by concatenating a plurality of tagged single data words having the same data type;
   (c) storing the data multiword within a location in the computer memory, the location selected to ensure alignment of the data multiword in accordance with its length;
   (d) constructing an effective tag value for the data multiword by concatenating each of the tags of the tagged single data words comprised by the data multiword; and
   (e) preventing an operation from being performed on the data multiword if the effective tag value is not one of a predetermined list of valid effective tag values for the operation.

2. The method according to claim 1 further comprising the step of prohibiting direct modification of a tag.

3. The method according to claim 1 further comprising the step of generating an exception in response to an attempt to perform the operation on the data multiword.

4. The method according to claim 1 further comprising the step of changing the effective tag value to represent numeric data in response to an attempt to perform the operation on the data multiword.

5. The method according to claim 1 further comprising the step of destroying any non-numeric data occupying a storage location in the computer memory in response to performing an operation that attempts to modify that storage location.

6. A method for constructing a secure data architecture for computer memory comprising the steps of:
   (a) forming a plurality of tagged non-numeric single data words by concatenating a tag to each such single data word, each such tag taking a value corresponding to the data type of the single data word to which it is concatenated;
   (b) creating a plurality of non-numeric data multiwords, each formed by concatenating a plurality of tagged single data words having the same non-numeric data type, at least two of the data multiwords comprising a different number of bits;
   (c) constructing an effective tag value for each data multiword by concatenating each of the tags of the tagged single data words comprised by that data multiword; and
   (d) preventing an operation from being performed on that data multiword if the effective tag value for that data multiword is not one of a predetermined list of valid effective tag values for the operation.

7. The method according to claim 6 further comprising the step of storing each data multiword within a location in the computer memory, each such location selected to ensure alignment of each data multiword in accordance with its length.

8. The method according to claim 6 wherein each the tag value of each single data word of each data multiword further designates the position of that single data word within that data multiword.

9. The method according to claim 6 further comprising the step of preventing an operation from being performed on one of the plurality of data multiwords if the effective tag value of that data multiword is not one of a predetermined list of valid effective tag values for the operation.

10. The method according to claim 9 further comprising the step of generating an exception in response to an attempt to perform the operation on that data multiword.

11. The method according to claim 9 further comprising the step of changing the effective tag value of that data multiword to represent numeric data in response to an attempt to perform the operation on that data multiword.

12. The method according to claim 6 further comprising the step of prohibiting direct modification of a tag.

13. The method according to claim 6 further comprising the step of destroying any non-numeric data occupying a storage location in the computer memory in response to performing an operation that attempts to modify that storage location.

14. A method for debugging a computer program comprising the steps of:
   (a) forming a plurality of tagged single data words by concatenating a tag to each such single data word, each such tag taking a value corresponding to the data type of the single data word to which it is concatenated;
   (b) creating a first data multiword by concatenating a plurality of tagged single data words having the same data type;
   (c) storing the first data multiword within a location in a computer memory, the location selected to ensure alignment of the first data multiword in accordance with its length;
   (d) constructing an effective tag value for the first data multiword by concatenating each of the tags of the tagged single data words comprised by the first data multiword;

(e) preventing an operation from being performed on the first data multiword if the effective tag value is not one of a predetermined list of valid effective tag values for the operation; and (f) notifying a user in response to an attempt to perform the operation on the first data multiword.

15. The method according to claim 14 further comprising the step of creating a second data multiword by concatenating a plurality of tagged single data words having the same data type, wherein the first data multiword and the second data multiword comprise different numbers of bits.

16. A computer apparatus for providing a secure data architecture comprising:

(a) a memory unit; and (b) a processing unit connected to the memory unit and programmed to:

(i) form a plurality of tagged single data words for storage in the memory unit by concatenating a tag to each such single data word, each such tag taking a value corresponding to the data type of the single data word to which it is concatenated;

(ii) create a data multiword by concatenating a plurality of tagged single data words having the same data type;

(iii) store the data multiword within a location in the memory unit, the location selected to ensure alignment of the data multiword in accordance with its length;

(iv) construct an effective tag value for the data multiword by concatenating each of the tags of the tagged single data words comprised by the data multiword; and (v) prevent an operation from being performed on the data multiword if the effective tag value is not one of a predetermined list of valid effective tag values for the operation.

17. The computer apparatus according to claim 16 wherein the processing unit is further programmed to prohibit direct modification of a tag.

18. The computer apparatus according to claim 16 wherein the processing unit is further programmed to generate an exception in response to an attempt to perform the operation on the data multiword.

19. The computer apparatus according to claim 16 wherein the processing unit is further programmed to change the effective tag value to represent numeric data in response to an attempt to perform the operation on the data multiword.

20. The computer apparatus according to claim 16 wherein the processing unit is further programmed to destroy any non-numeric data occupying a storage location in the memory unit in response to performing an operation that attempts to modify that storage location.

21. A computer apparatus for providing a secure data architecture comprising:

(a) a memory unit; and (b) a processing unit connected to the memory unit and programmed to:

(i) form a plurality of tagged non-numeric single data words for storage in the memory unit by concatenating a tag to each such single data word, each such tag taking a value corresponding to the data type of the single data word to which it is concatenated;

(ii) create a plurality of non-numeric data multiwords, each formed by concatenating a plurality of tagged single data words having the same non-numeric data type, at least two of the data multiwords comprising a different number of bits;

(iii) construct an effective tag value for each data multiword by concatenating each of the tags of the tagged single data words comprised by that data multiword; and (iv) prevent an operation from being performed on that data multiword if the effective tag value for that data multiword is not one of a predetermined list of valid effective tag values for the operation.

22. The computer apparatus according to claim 21 wherein the processing unit is further programmed to store each data multiword within a location in the memory unit, each such location selected to ensure alignment of each data multiword in accordance with its length.

23. The computer apparatus according to claim 21 wherein the tag value of each single data word of each data multiword further designates the position of that single data word within that data multiword.

24. The computer apparatus according to claim 21 wherein the processing unit is further programmed to prevent an operation from being performed on one of the plurality of data multiwords if the effective tag value of that data multiword is not one of a predetermined list of valid effective tag values for the operation.

25. The computer apparatus according to claim 24 wherein the processing unit is further programmed to generate an exception in response to an attempt to perform the operation on that data multiword.

26. The computer apparatus according to claim 24 wherein the processing unit is further programmed to change the effective tag value of that data multiword to represent numeric data in response to an attempt to perform the operation on that data multiword.

27. The computer apparatus according to claim 21 wherein the processing unit is further programmed to prohibit direct modification of a tag.

28. The computer apparatus according to claim 21 wherein the processing unit is further programmed to destroy any non-numeric data occupying a storage location in the memory unit in response to performing an operation that attempts to modify that storage location.

29. A computer apparatus for debugging a computer program comprising:

(a) a memory unit; and (b) a processing unit connected to the memory unit and programmed to:

(i) form a plurality of tagged single data words for storage in the memory unit by concatenating a tag to each such single data word, each such tag taking a value corresponding to the data type of the single data word to which it is concatenated;

(ii) create a first data multiword by concatenating a plurality of tagged single data words having the same data type;

(iii) store the first data multiword within a location in the memory unit, the location selected to ensure alignment of the first data multiword in accordance with its length;

(iv) construct an effective tag value for the first data multiword by concatenating each of the tags of the tagged single data words comprised by the first data multiword;

(v) prevent an operation from being performed on the first data multiword if the effective tag value is not one of a predetermined list of valid effective tag values for the operation; and (vi) notify a user in response to an attempt to perform the operation on the first data multiword.

30. The computer apparatus according to claim 29 wherein the processing unit is further programmed to create a second data multiword by concatenating a plurality of tagged single data words having the same data type, wherein the first data multiword and the second data multiword comprise different numbers of bits.

* * * * *